United States Patent
Barchasz et al.

(10) Patent No.: US 10,964,932 B2
(45) Date of Patent: Mar. 30, 2021

(54) METHOD FOR MANUFACTURING AN ELECTRODE FOR A LITHIUM-SULFUR BATTERY HAVING A LARGE ACTIVE SURFACE AREA

(71) Applicant: Commissariat A L'Energie Atomique Et Aux Energies Alternatives, Paris (FR)

(72) Inventors: Céline Barchasz, Fontaine (FR); Marco Bolloli, Grenoble (FR); Rémi Vincent, Grenoble (FR)

(73) Assignee: Commissariat A L'Energie Atomique Et Aux Energies Alternatives, Paris (FR)

( * ) Notice: Subject to any disclaimer, the term of this patent is extended or adjusted under 35 U.S.C. 154(b) by 33 days.

(21) Appl. No.: 16/129,488

(22) Filed: Sep. 12, 2018

(65) Prior Publication Data
US 2019/0088920 A1    Mar. 21, 2019

(30) Foreign Application Priority Data
Sep. 15, 2017 (FR) ........................ 1758591

(51) Int. Cl.
*H01M 4/04* (2006.01)
*H01M 4/38* (2006.01)
(Continued)

(52) U.S. Cl.
CPC .......... *H01M 4/0402* (2013.01); *C01B 32/16* (2017.08); *H01M 4/136* (2013.01);
(Continued)

(58) Field of Classification Search
CPC ...... H01M 4/0402; H01M 4/136; H01M 4/38; H01M 4/364
See application file for complete search history.

(56) References Cited

U.S. PATENT DOCUMENTS

2007/0287060 A1*  12/2007  Naoi ................. H01M 4/38
                                                                429/122
2008/0025906 A1*   1/2008  Lin .................. B82Y 30/00
                                                                423/448
(Continued)

FOREIGN PATENT DOCUMENTS

CN    104 779 376 A    7/2015
CN    104 779 379 A    7/2015
(Continued)

*Primary Examiner* — Ula C Ruddock
*Assistant Examiner* — Frank A Chernow
(74) *Attorney, Agent, or Firm* — Alston & Bird LLP

(57) ABSTRACT

The invention relates to a method for preparing a positive electrode for a lithium-sulfur battery, comprising the following steps:
a) a step of preparing a first mixture by placing a carbon additive such as carbon black and/or activated carbon, a carbon additive chosen from carbon nanotubes, carbon fibres and the mixtures of the two, a carbon organic binder, and a solvent in contact;
b) a step of carbonising said mixture, by means of which the result is a powder comprising agglomerates of carbon black and/or activated carbon and of carbon nanotubes and/or carbon fibres;
c) a step of placing the powder obtained in b) in contact with sulfur thus forming a second mixture;
d) a step of dispersing said second mixture in an organic binder;
e) a step of depositing the dispersion thus obtained on a substrate; and
f) a step of drying said dispersion thus deposited.

13 Claims, 1 Drawing Sheet

(51) Int. Cl.
*H01M 10/052* (2010.01)
*C01B 32/16* (2017.01)
*H01M 4/62* (2006.01)
*H01M 4/36* (2006.01)
*H01M 4/1397* (2010.01)
*H01M 4/136* (2010.01)
*H01M 4/02* (2006.01)

(52) U.S. Cl.
CPC ......... *H01M 4/1397* (2013.01); *H01M 4/364* (2013.01); *H01M 4/38* (2013.01); *H01M 4/622* (2013.01); *H01M 4/625* (2013.01); *H01M 10/052* (2013.01); *H01M 2004/028* (2013.01)

(56) References Cited

U.S. PATENT DOCUMENTS

| | | | |
|---|---|---|---|
| 2012/0048729 A1* | 3/2012 | Mikhaylik | H01M 2/14 204/252 |
| 2013/0244097 A1 | 9/2013 | Leitner et al. | |
| 2014/0106239 A1 | 4/2014 | Barchasz et al. | |

FOREIGN PATENT DOCUMENTS

| | | |
|---|---|---|
| CN | 105 826 540 A | 6/2016 |
| WO | WO 2017/143549 A1 | 8/2017 |

\* cited by examiner

METHOD FOR MANUFACTURING AN ELECTRODE FOR A LITHIUM-SULFUR BATTERY HAVING A LARGE ACTIVE SURFACE AREA

CROSS REFERENCE TO RELATED APPLICATIONS

This application claims the benefit of French Application No. FR 17 58591, filed Sep. 15, 2017, all of which is herein incorporated by reference in their entirety.

TECHNICAL FIELD

The present invention relates to a method for preparing a positive electrode for a lithium-sulfur electrochemical battery having a large active surface area.

The present invention also relates to a lithium-sulfur electrochemical battery comprising such an electrode.

The general field of the invention can thus be defined as that of devices for storing energy, in particular that of lithium electrochemical batteries and, even more particularly, lithium-sulfur electrochemical batteries.

Prior Art

Devices for storing energy are conventionally electrochemical batteries operating on the principle of electrochemical cells suitable for delivering an electric current via the presence, in each of them, of a pair of electrodes (respectively, a positive electrode and a negative electrode) separated by an electrolyte, the electrodes comprising specific materials suitable for reacting according to an oxidation-reduction reaction, by means of which electrons are produced that are responsible for the electric current and there are productions of ions that circulate from one electrode to the other via an electrolyte.

Out of the batteries of this type, the most used currently are the following:
- the Ni-MH batteries that use metal hydride and nickel oxyhydroxide as electrode materials;
- the Ni—Cd batteries that use cadmium and nickel oxyhydroxide as electrode materials;
- the Acid-Lead batteries that use lead and $PbO_2$ lead oxide as electrode materials; and
- lithium batteries, such as lithium-ion batteries, which conventionally use, entirely or partly, lithiated materials as electrode materials.

Since lithium is a particularly light solid element and has a very low electrochemical potential, thus allowing access to an attractive specific energy, lithium batteries have largely deposed the other batteries mentioned above because of the continual improvement in the performance of Li-ion batteries in terms of energy density. Indeed, lithium-ion batteries allow specific energies (which can now reach almost 200 $Wh \cdot kg^{-1}$) that are clearly greater than those of Ni-MH and Ni—Cd batteries (which can range from 50 and 100 $Wh \cdot kg^{-1}$) and Acid-lead batteries (which can range from 30 to 35 $Wh \cdot kg^{-1}$) to be obtained. Moreover, Li-ion batteries can have a nominal cell voltage greater than that of the other batteries (for example, a nominal voltage of approximately 3.6V for a cell implementing the pair $LiCoO_2$/graphite as electrode materials versus a nominal voltage of approximately 1.5V for the other aforementioned batteries). These systems also have low self-discharge and a high service life (from 500 to 1000 cycles, for example).

Due to their intrinsic properties, Li-ion batteries are therefore of particular interest for the fields in which battery life is a crucial criterion, as is the case of the fields of computers, video, telephony, transport such as electric vehicles, hybrid vehicles, and the medical, spatial, microelectronics fields. However, at present, the technology of lithium-ion batteries is seeing its performance reach its limits.

Currently, a new battery technology based on lithium is appearing as a promising alternative, this technology being lithium/sulfur technology, in which the positive electrode comprises, as the active material, elemental sulfur or a derivative of sulfur, such as lithium sulfide or a lithium polysulfide.

The use of sulfur, as an active material, of a positive electrode is of particular interest since sulfur has a very high theoretic specific capacity that can be up to 10 times greater than that obtained for conventional positive electrode materials (approximately 1675 mAh/g for sulfur instead of 140 mAh/g for $LiCoO_2$). Moreover, sulfur is present, abundantly, on this planet and is characterised, therefore by low costs. Finally, it is not very toxic. All these qualities contribute to making it particularly attractive for large-scale implementation, in particular for electric vehicles, especially since lithium-sulfur batteries can allow specific energies to be reached that can range from 300 to 600 $Wh \cdot g^{-1}$.

From a functional point of view, the reaction responsible for the production of current (that is to say, when the accumulator is in discharge mode) involves a reaction of oxidation of the lithium at the negative electrode that produces electrons, which supply the outside circuit to which the positive and negative electrodes are connected, and a reaction of reduction of the sulfur at the positive electrode.

Thus, explicitly, during the discharge process, the overall reaction is the following:

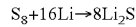

$$S_8 + 16Li \rightarrow 8Li_2S$$

which is the sum of the reaction of reduction of the sulfur at the positive electrode ($S_8 + 16e^- \rightarrow 8S^{2-}$) and the reaction of oxidation of the lithium at the negative electrode ($Li \rightarrow Li^+ + e^-$).

It is understood that the reverse electrochemical reactions are produced during the charging process.

As is clear from the above equation, the reaction involves an exchange of 16 electrons, which justifies the high specific capacity of the sulfur (1675 $mAh \cdot g^{-1}$).

From a mechanistic point of view, and without being limited by the theory, in the initial state (that is to say, when the battery is in a completely charged state), the active material, which is elemental sulfur, is present in the solid state in the positive electrode. During the reduction of the sulfur, that is to say, during the discharge, the cyclic molecules of sulfur are reduced and form linear chains of polysulfides of lithium, having the general formula $Li_2S_n$, with n capable of being from 2 to 8. Since the starting molecule is $S_8$, the first compounds formed are the long-chain lithium polysulfides, such as $Li_2S_8$ and $Li_2S_6$. Since these lithium polysulfides are soluble in organic electrolytes, the first discharge step thus involves the solubilisation of the active material in the electrolyte and the production of long-chain lithium polysulfides in solution. Then, as the reduction of the sulfur progresses, the chain length of the polysulfides is gradually reduced and compounds such as $Li_2S_8$, $Li_2S_6$ and $Li_2S_4$ are formed in solution. Finally, the final reduction product is lithium sulfide ($Li_2S$), which is insoluble in organic electrolytes. Thus, the last step of the mechanism of reduction of the sulfur involves the precipitation of the $Li_2S$ sulfur active material.

This mechanism can be correlated to the discharge profile illustrated in FIG. 1, which shows a graph illustrating the evolution of the potential E (in V) according to the capacity C (in a.u).

Indeed, in this profile, the first plateau can be attributed to the formation of the long chains of lithium polysulfides, while the second plateau corresponds to the reduction of the size of the sulfur chains, until passivation of the positive electrode.

However, lithium-sulfur batteries have a certain number of disadvantages.

The first limitation is of a kinetic nature, since sulfur is an insulating material. Sulfur is also soluble in the organic electrolytes used. Thus solubilised, it can contribute to causing the corrosion of the lithium negative electrode and is responsible for the significant self-discharge of lithium-sulfur batteries.

The polysulfide intermediates are also soluble in the electrolyte and are capable of reacting with the negative electrode. They thus also promote the self-discharge of the battery. Furthermore, they are responsible for the creation of a shuttle mechanism that is produced during charging and which leads to the degradation of the performance of the battery, in particular in terms of coulombic efficiency. Finally, the discharge product $Li_2S$ is insoluble in the electrolyte and electronically insulating. It thus precipitates at the end of discharge and passivates the surface of the electrodes, which thus become electrochemically blocking. The practical capacities obtained can thus generally be well below the theoretical capacity, approximately 300 to 1000 $mAh \cdot g^{-1}$ (the theoretical capacity being approximately 1675 $mAh \cdot g^{-1}$).

Thus, improvements must be made with regard to the architecture of the batteries, for example at the positive electrode containing sulfur.

From a structural point of view, a lithium/sulfur battery conventionally comprises at least one electrochemical cell comprising two electrodes containing different materials (a positive electrode comprising elemental sulfur as the active material and a negative electrode comprising metallic lithium as the active material), between which an organic liquid electrolyte is placed.

With regard to the positive electrode comprising sulfur, it is conventionally obtained by a method of coating on a substrate that forms the current collector, in order to give an assembly formed by two parts consisting of the current collector and the positive electrode as such. More specifically, first, an ink comprising a solvent, the active material, a carbon material (in order to improve the overall electronic conductivity of the electrode) and a binder is created. Secondly, the ink is deposited on a substrate intended to form the current collector, which is generally a metal sheet (like a strip made of aluminium). After evaporation of the solvent and drying, an electrode comprising sulfur deposited on a current collector is thus obtained, the resulting assembly then being incorporated into a cell comprising a separator impregnated with organic liquid electrolyte, a negative electrode, the negative electrode and the positive electrode being positioned, on either side of the separator. The percentage of sulfur in the electrode is generally significant, generally from 50 to 90% and, preferably, greater than 70% by weight, in such a way as to obtain batteries having a high energy density.

The mechanism of discharge of a lithium-sulfur battery using such a positive electrode first passes through a step of dissolution of the active material, which leads to a collapse of the initial structure of the porous electrode because of the significant percentage of sulfur in the electrode. After dissolution of the sulfur, the porosity of the electrode is such that the structure cannot be maintained and collapses. The available surface area of the electrode is thus reduced and grains of material or of carbon/binder composite can be detached from the support formed by the current collector. This damage and this resulting loss of active surface area are crucial at the end of discharge, since the species formed (in particular $Li_2S$) are both very insulating and insoluble in the organic electrolyte. Consequently, they precipitate at the positive electrode and are responsible for its progressive passivation. However, since the thickness of the material deposited is limited to several nanometres ($Li_2S$ insulating and thus passivating), the deposition of a significant quantity of active material thus depends on the electrode conductive specific surface area available.

Moreover, the final compound of discharge $Li_2S$ has a volume two times greater than that of sulfur, which can also contribute to the pulverisation of the positive-electrode structure at the end of discharge. In conclusion, the cycles of dissolution/precipitation of the active material inherent to the discharge mechanism are thus responsible for the low recovered practical capacity and the low cycle life of lithium-sulfur batteries.

In order to prevent the pulverisation of the electrode, the idea would be to reinforce the mechanical properties of the latter, which was proposed by Yiwen Ma et al. (Scientific Reports, 5, 2015, 14949, Lithium Sulfur Primary Battery with Super High Energy Density: Based on the Cauliflower-like structured C/S Cathode) by first agglomerating particles of carbon (for example, carbon black of the brand Ketjenblack®) with a binder (for example gelatine) then the agglomerated particles are then subjected to a carbonisation treatment and can be used as the active material with a moderate quantity of binder, the authors, however, having only used these particles in the context of a primary cell, which is not therefore subjected to cycling modes.

Moreover, when it is necessary to work on the design of positive electrodes having a large active surface area, which involves in particular the use of a carbon additive having a large active surface area such as carbon black, it turns out that the design can be difficult in particular because of the appearance of cracks during the drying of the ink comprising this additive. This phenomenon can be stemmed in whole or in part by increasing the concentration of organic binder in the ink. However, the addition of a significant quantity of binder occurs at the expense of the addition of active material (in this case, sulfur for lithium-sulfur batteries) and is generally immobilised on the surface of the particles of carbon. Too much addition of binder thus considerably reduces the interest of using carbon additives having a large specific surface area, since the useful porosity is plugged and inaccessible to the sulfur.

In light of that which exists, the authors of the present invention have thus set out to develop a new method for preparing a positive electrode for a lithium-sulfur battery, which allows in particular the cohesion of the latter to be ensured during the cycling of the battery while having a large specific surface area.

DISCLOSURE OF THE INVENTION

Thus, the invention relates to a method for preparing a positive electrode for a lithium-sulfur battery, comprising the following steps:

a) a step of preparing a first mixture by placing a carbon additive which is carbon black and/or activated carbon; a carbon additive chosen from carbon nanotubes, carbon fibres and mixtures thereof; a carbon organic binder, and a solvent in contact;

b) a step of carbonising said mixture, by means of which the result is a powder comprising agglomerates of carbon black and/or activated carbon and of carbon nanotubes and/or carbon fibres;

c) a step of placing the powder obtained in b) in contact with sulfur thus forming a second mixture;

d) a step of dispersing said second mixture in an organic binder;

e) a step of depositing the dispersion thus obtained on a substrate; and f) a step of drying said dispersion thus deposited.

The implementation of such a method, involving the formation of a powder comprising agglomerates of carbon black and/or activated carbon and of carbon nanotubes and/or carbon fibres, which is thus a mechanically reinforced powder, the phenomenon of cracking, which would occur during the step of drying a suspension comprising carbon black, a binder and an organic solvent, is prevented. Moreover, besides the fact that this phenomenon of cracking is prevented, the method allows a positive electrode having excellent mechanical strength and a large active surface area and suitable for undergoing a large number of cycle of dissolution of the active material without degradation to be obtained.

The method of the invention comprises, first of all a step of preparing a first mixture by placing a carbon additive which is carbon black and/or activated carbon; a carbon additive chosen from carbon nanotubes, carbon fibres and mixtures thereof; a carbon organic binder, and a solvent in contact.

The carbon additive of the first mixture can be of carbon black and more specifically a powder of carbon black, this additive being in particular intended to ensure the electrical conduction in the positive electrode. Because it is in the form of a powder, it is characterised by a large specific surface area, such as a specific surface are greater than 1000 $m^2/g$.

Examples of carbon black include those sold under the brands Ketjenblack® (AzkoNobel), Vulcan® (Cabot), Super-P® (Timcal).

With regard to the activated carbon, it is, advantageously, a carbon having a porous structure, consisting of spheroidal particles having a diameter of several micrometres (and more specifically, from 2 to 15 micrometres and even more specifically of approximately 10 micrometres) and comprising pores (specifically from 1 to 100 nm and, even more specifically from 10 to 50 nm) and a large developed specific surface area typically with a specific surface area ranging from 800 to 1800 $m^2/g$.

Moreover, the first mixture comprises at least one carbon additive other than that defined above, chosen from carbon nanotubes, carbon fibres and mixtures thereof.

With regard to the carbon nanotubes, these can be single-walled carbon nanotubes (or SWNT) or multi-walled carbon nanotubes (or MWNT).

With regard to the carbon fibres, these can be ground carbon fibres, carbon fibres obtained in vapour phase or mixtures thereof. The ground carbon fibres can in particular have a length ranging from 100 µm to 1 mm.

The carbon fibres obtained in vapour phase can be those sold under the brand VGCF®.

The carbon fibres used have, advantageously a length less than that of the fibres routinely used in the conventional methods for manufacturing woven or nonwoven fabrics (which fibres have a length of approximately several mm). They allow the mechanical strength to be adjusted and ensure the electronic percolation in the structure.

The additives such as carbon fibres or carbon nanotubes have, in the end, a role of mechanical reinforcement, which allows the appearance of cracks during the step of drying and thus a poor quality of the positive electrode to be prevented. It is thus no longer necessary to use, in the positive electrode, such a large quantity of organic binder in order to limit this phenomenon.

Moreover, these additives allow a pre-agglomeration of the powder of carbon black and/or activated carbon during the carbonisation step, by means of which the result is a powder of particles resulting from the agglomeration of the carbon black and/or activated carbon and the carbon nanotubes and/or carbon fibres.

The carbon organic binders that can be used in the first mixture are advantageously polymers having a high concentration of carbon, for example, a concentration of carbon greater than 50% and can be, for example, phenolic resins, which result, conventionally, from the polycondensation of a phenolic monomer and of formaldehyde, as a result of which they are also called phenol-formaldehyde resins or formophenolic resins.

Binders other than phenolic resins may be suitable such as cellulosic binders (such as a carboxymethylcellulose), epoxide binders, polyacetate binders (such as a polyvinyl acetate).

With regard to the solvent, it can be water, an organic solvent, such as an alcoholic solvent or a mixture of organic solvents or a mixture comprising one or more organic solvents and water.

The proportions of these ingredients in the composition can be the following:

5 to 50% by weight for the additive which is carbon black and/or activated carbon;

1 to 20% by weight for the additive which is carbon nanotubes and/or carbon fibres;

1 to 20% by weight for the carbon organic binder;

50 to 98% by weight for the solvent;

the weight percentage being expressed with respect to the total weight of the ingredients.

The method of the invention comprises a step of carbonising the first mixture obtained in step a), which allows the elimination of the carbon organic binder and of the solvent and only leaves carbon from these compounds, for example amorphous carbon, which acts as a cement between the carbon black and/or activated carbon and the carbon nanotubes and/or the carbon fibres thus forming solid particles resulting from the agglomeration of the carbon black and/or activated carbon and of the carbon nanotubes and/or carbon fibres. Moreover, this step can allow the formation of particles that are exclusively carbon and have a large specific surface area (for example, greater than 1000 $m^2/g$).

The carbonisation step is carried out, advantageously, in an inert atmosphere, for example, in an argon atmosphere, in order to prevent any oxidation phenomena. Moreover, it is carried out, conventionally, at an effective temperature and effective duration necessary for the transformation of the organic compounds into carbon, wherein this temperature and this duration can be easily set by a person skilled in the art by analysing, via conventional techniques, the composition of the product obtained, and the heating can be stopped as soon as only carbon remains in the mixture.

For example, the step of carbonisation can be carried out at a temperature ranging from 800 to 1500° C. for a duration ranging from 1 minute to 10 hours.

In order to accelerate the process of carbonisation, the step of carbonisation as such can be preceded by a step of drying the first mixture obtained in a) in order to at least partly eliminate the solvent followed by a step of grinding the material in the form of grains.

After this carbonisation step, there remains a powder consisting of particles resulting from the agglomeration of the carbon black and/or activated carbon and of the carbon nanotubes and/or carbon fibres bound together by amorphous carbon resulting from the carbonisation.

The powder thus formed is then placed in contact with sulfur thus forming a second mixture. It is understood that this is elemental sulfur, which forms the active material of the positive electrode, namely the material directly involved in the reactions of charge or discharge for lithium-sulfur batteries. This step of placing in contact can be accompanied by a concomitant grinding, in which case this step can be carried out in a grinder, for example, a jar mill, which allows an intimate mixture of the ingredients to be obtained, but also a good particle size distribution of the powder to be obtained, in order to simplify the later dispersion.

Between the step of forming the second mixture c) and the step of dispersion d), the method can comprise an intermediate step involving bringing, preferably, in an inert atmosphere, the second mixture to a temperature greater than the melting temperature of the sulfur (for example, a temperature of 150° C.) and then letting it come back to ambient temperature. In this manner, the sulfur thus melted diffuses via capillarity into the particles of the mixture and forms an intimate composite mixture of the various ingredients present.

The second mixture is then dispersed in an organic binder, which organic binder can be in solution in an organic solvent or an aqueous solvent.

With regard to the organic binder, it can be chosen from:
polymer binders belonging to the category of cellulosic polymers, such as carboxymethylcellulose (known by the abbreviation CMC), methylcellulose (known by the abbreviation MC);
polymer binders belonging to the category of fluorinated ethylene polymers, such as polytetrafluoroethylene (known by the abbreviation PTFE);
polymer binders belonging to the category of poly(ethylene oxides) (known by the abbreviation POE);
polymer binders belonging to the category of vinyl polymers, such as polyvinyl alcohol (known by the abbreviation PVA); and
mixtures thereof.

The organic binder can allow cohesion between the various ingredients of the second mixture, once the positive electrode has been completed.

The organic binder can be present, in the dispersion, in a concentration ranging from 5 to 30% of the total weight of the ingredients of the dispersion (besides the solvent if necessary), an advantageous specific concentration being 5%.

The dispersion is then deposited on a substrate and, more specifically a substrate intended to form the current-collector substrate of the positive electrode and then dried, the resulting product forming the positive electrode as such.

The deposition of the dispersion is possible via various techniques, such as:
dip-coating;
spin-coating;
laminar-flow-coating or meniscus coating;
spray-coating;
slip coating;
the roll to roll process;
paint coating;
screen printing; or
the techniques using a blade for the deposition (known by the term "blade-coating").

With regard to the drying, it is carried out in such a way as to eliminate the volatile organic compounds of the dispersion.

The product resulting from the method is a positive electrode for a lithium-sulfur battery and is intended to be assembled in a lithium-sulfur battery comprising at least one cell comprising:
a positive electrode obtained according to the method of the invention as defined above;
a negative electrode; and
an electrolyte that conducts lithium ions, deposited between said structure and said negative electrode.

The following definitions are specified.

Positive electrode means, conventionally, above and hereinafter, the electrode that acts as a cathode, when the battery delivers current (that is to say, when it is in the process of discharging) and that acts as an anode when the battery is in the process of charging.

Negative electrode means, conventionally, above and hereinafter, the electrode that acts as an anode, when the battery delivers current (that is to say, when it is in the process of discharging) and that acts as a cathode when the battery is in the process of charging.

The negative electrode can be self-supporting (that is to say, not requiring placement on a support, such as a current-collector support) or can comprise, preferably, a current-collector substrate on which at least the active material of the negative electrode is placed, wherein this active material can advantageously be metallic lithium.

The current-collector substrate can be made from a metal material (composed of a single metal element or an alloy of a metal element with another element), in the form, for example, of a plate or strip, wherein a specific example of a current-collector substrate can be a strip made of stainless steel, nickel or copper. The current-collector substrate can also be made from a carbon material.

The electrolyte is an electrolyte that conducts lithium ions, wherein this electrolyte can be, in particular, a liquid electrolyte comprising at least one organic solvent and at least one lithium salt.

The organic solvent(s) can be, for example, a solvent comprising one or more ether, nitrile, sulfone and/or carbonate function with, for example, a carbon chain that can comprise from 1 to 10 atoms of carbon.

Examples of solvents comprising a carbonate function include:
cyclic carbonate solvents, such as ethylene carbonate (symbolised by the abbreviation EC), propylene carbonate (symbolised by the abbreviation PC).
linear carbonate solvents, such as diethyl carbonate (symbolised by the abbreviation DEC), dimethyl carbonate (symbolised by the abbreviation DMC), ethylmethyl carbonate (symbolised by the abbreviation EMC).

Examples of solvents comprising an ether function include ether solvents, such as 1,3-dioxolane (symbolised by the abbreviation DIOX), tetrahydrofuran (symbolised by the abbreviation THF), 1,2-dimethoxyethane (symbolised by the abbreviation DME), and an ether having the general formula $CH_3O-[CH_2CH_2O]_n-OCH_3$ (n being an integer ranging from 1 and 10), such as tetraethylene glycol dimethyl ether (symbolised by the abbreviation TEGDME) and the mixtures thereof.

Preferably, the organic solvent is an ether solvent or a mixture of ether solvents.

The lithium salt can be chosen from the group consisting of $LiPF_6$, $LiClO_4$, $LiBF_4$, $LiAsF_6$, LiI, $LiNO_3$ $LiR_fSO_3$ (with $R_f$ corresponding to a perfluoroalkyl group comprising from 1 to 8 atoms of carbon), $LiN(CF_3SO_2)_2$ (also called lithium bis[(trifluoromethyl)sulfonyl]imide corresponding to the abbreviation LiTFSI), $LiN(C_2F_5SO_2)_2$ (also called lithium bis[(perfluoroethyl)sulfonyl]imide corresponding to the abbreviation LiBETI), $LiCH_3SO_3$, $LiB(C_2O_4)_2$ (also called lithium bis(oxalato)borate or LiBOB) and the mixtures thereof, the preference being for an $LiTFSI/LiNO_3$ mixture.

The lithium salt can be present, in the electrolyte, in a concentration ranging from 0.25M to 2M, for example, 1M.

Furthermore, when the battery operates in a catholyte configuration, the electrolyte can comprise at least one lithium polysulfide compound having the formula $Li_2S_n$ with n being an integer ranging from 2 to 8.

This compound thus forms the source of sulfur for the positive electrode.

In this case, the quantity of lithium polysulfide compound introduced into the electrolyte is adapted according to the specific surface area of the structure obtained according to the method of the invention, said area dictating the quantity of active material that can be deposited. For example, the lithium polysulfide compound can be dissolved in the electrolyte at a concentration ranging from 0.25 mol·$L^{-1}$ to the saturation concentration.

The electrolyte, when it comprises at least one lithium polysulfide compound as defined above, can be qualified as a "catholyte".

In lithium-sulfur batteries, the aforementioned liquid electrolyte can be brought, in the electrochemical cells of the lithium-sulfur batteries, to impregnate a separator, which is deposited between the positive electrode and the negative electrode of the electrochemical cell.

This separator can be made from a porous material, such as a polymer material, suitable for collecting, in its porosity, the liquid electrolyte.

The electrolyte can also be a gelled electrolyte, which corresponds, in this case, to an electrolyte comprising an organic solvent and a lithium salt, similar to those described above, which impregnates a porous matrix that swells when absorbing the electrolyte, wherein such a matrix can be an ethylene polyoxide (known by the abbreviation POE), a polyacrylonitrile (known by the abbreviation PAN), a polymethyl methacrylate (known by the abbreviation PMMA), a vinylidene polyfluoride (known by the abbreviation PVDF) or their derivatives.

The invention will now be described in reference to the specific embodiments defined below in reference to the appended drawings.

DETAILED DISCLOSURE OF SPECIFIC EMBODIMENTS

Example

The present example illustrates the preparation of a positive electrode according to the method of the invention.

To do this, a composition is prepared by mixture, in 400 g of ethanol, of Ketjenblack® EC-600 JD carbon black (4 g), of phenolic resin (1 g). After stirring of the mixture at 4000 revolutions/min for 15 minutes, 1 g of carbon nanotubes is added. The resulting mixture is stirred for 15 minutes at 4000 revolutions/minute. Then, the ethanol is evaporated in order to obtain a dry material.

The material thus obtained is reduced into grains in order to be carbonised in a tube furnace at 950° C. under argon for 1 hour. This step allows the phenolic resin to be transformed into carbon and the agglomerates comprising the carbon black and the carbon nanotubes to be bound together, these agglomerates entirely consisting of carbon having strong mechanical cohesion and a large active surface area (greater than 1000 $m^2/g$ according to the BET method).

The carbon material thus structured and in the form of a powder is then mixed with elemental sulfur for 1 hour in a jar mill, by means of which a homogenous mixture is obtained. The mixture weight ratio between the sulfur and the carbon is 2/1.

The mixture is then subjected to a heating of 150° C. for 1 hour, which melts the sulfur on the surface of the particles of carbon.

The mixture thus obtained after this heat treatment is used for the manufacturing of a liquid composition (or ink) comprising 95% by weight of said mixture and 5% by weight of carboxymethylcellulose at 2% in water.

The composition thus formulated is coated onto a sheet of aluminium and dried at 80° C. under air, by means of which the result is a positive electrode deposited on a current collector consisting of the sheet of aluminium. The grammage of the electrode obtained is approximately 4.5 mg of sulfur/$cm^2$.

For comparison, a reference positive electrode is manufactured by blade-coating a sheet of aluminium with a composition comprising:
80% elemental sulfur by weight;
10% Super P® carbon black;
10% carboxymethylcellulose.
followed by drying at 80° C. in air.

The grammage of the electrode in terms of sulfur is approximately 4.5 mg of sulfur/$cm^2$.

Two batteries are assembled with, respectively, the positive electrode corresponding to the method of the invention and the reference electrode.

Each of these batteries comprises:
as the negative electrode, an electrode made of metallic lithium;
as the electrolyte, a tetraethylene glycol dimethyl ether/dioxolane (TEGDME/DIOX) mixture (1:1 by volume) comprising LiTFSI (1M) and $LiNO_3$ (0.1M).

Figure 1:
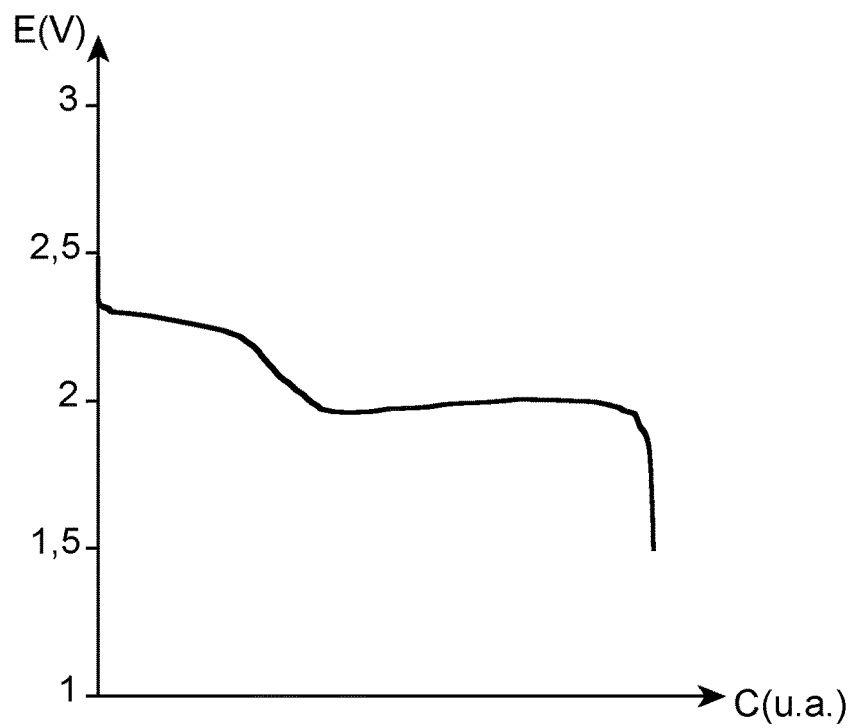
FIG. 1 is a graph illustrating the change in the potential E (in V) as a function of the capacity C (in a.u).
Figure 2:
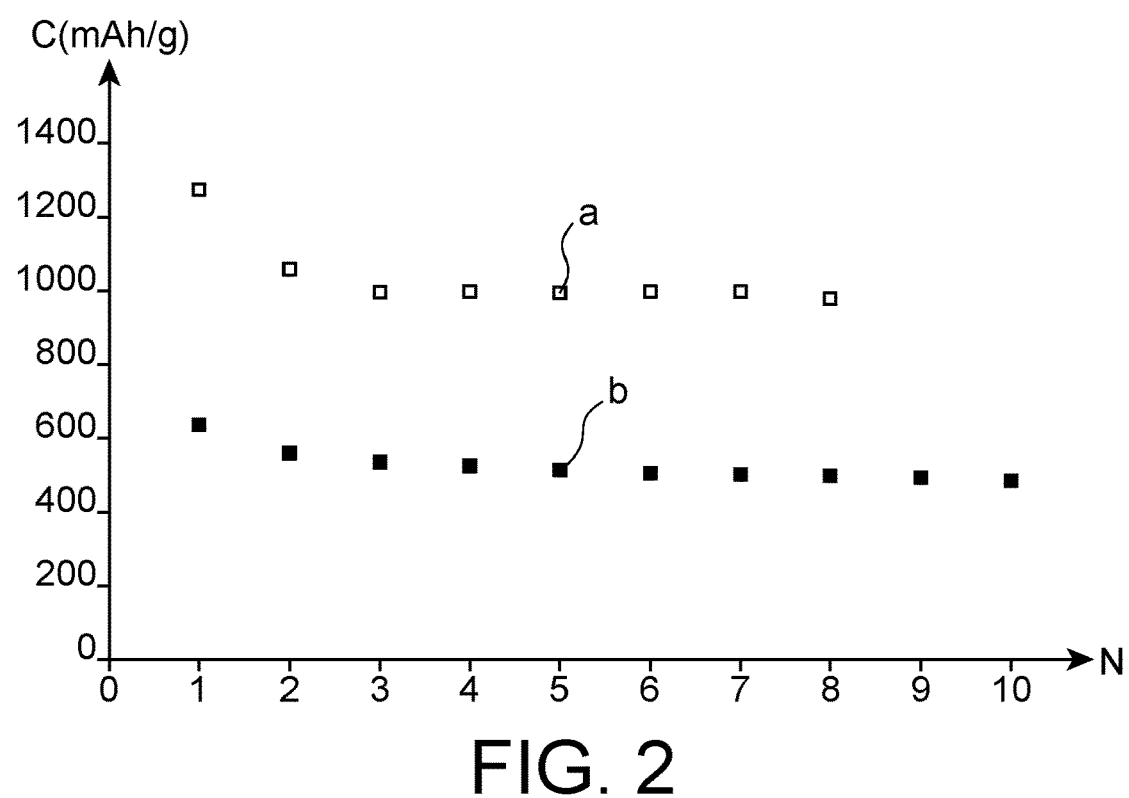
FIG. 2 is a graph illustrating the change in the discharge capacity C (in mAh/g) as a function of the number of cycles for two batteries implemented according to the example disclosed below.

The change in the discharge capacity C (in mAh/g) as a function of the number of cycles N was determined for these two batteries, the results being reported in the appended FIG. 2 (curve a) for the battery comprising the positive electrode obtained according to the method of the invention and curve b) for the battery comprising the reference positive electrode).

It follows that the battery comprising the electrode obtained according to the method of the invention has better performance in terms of discharge capacity than the battery comprising the reference electrode.

What is claimed is:

1. A method for preparing a positive electrode for a lithium-sulfur battery, comprising:
   a. preparing a first mixture by placing a carbon additive which is carbon black and/or activated carbon; a carbon additive selected from the group consisting of carbon nanotubes, carbon fibres and mixtures thereof; a carbon organic binder, and a solvent in contact;
   b. carbonising said mixture, to prepare a powder comprising agglomerates of carbon black and/or activated carbon and of carbon nanotubes and/or carbon fibres;
   c. placing the powder obtained in b) in contact with sulfur thus forming a second mixture;
   d. dispersing said second mixture in an organic binder;
   e. depositing the dispersion thus obtained on a substrate; and
   f. drying said dispersion thus deposited.

2. The method of claim 1, wherein the carbon fibres are selected from the group consisting of ground carbon fibres, carbon fibres obtained in vapour phase and mixtures thereof.

3. The method of claim 1, wherein the carbon organic binder of a) is a phenolic resin.

4. The method of claim 1, wherein the carbonisation is carried out in an inert atmosphere.

5. The method of claim 1, further comprising, between c) and d), allowing the second mixture to warm to a temperature greater than the melting temperature of the sulfur and allowing the second mixture to cool to ambient temperature.

6. The method of claim 1, wherein the organic binder of d) is a polymer binder.

7. The method of claim 6, wherein said polymer is selected from the group consisting of cellulosic polymers.

8. The method of claim 7, wherein said cellulosic polymer is selected from the group consisting of carboxymethylcellulose and methylcellulose.

9. The method of claim 6, wherein said polymer is selected from the group consisting of fluorinated ethylene polymers.

10. The method of claim 9, wherein said fluorinated ethylene polymer is selected from the group consisting of polytetrafluoroethylene.

11. The method of claim 6, wherein said polymer is selected from the group consisting of poly(ethylene oxides).

12. The method of claim 6, wherein said polymer is selected from the group consisting of vinyl polymers.

13. The method of claim 12, wherein said vinyl polymer is selected from the group consisting of polyvinyl alcohol.

* * * * *